(12) United States Patent
Howarth et al.

(10) Patent No.: US 7,770,168 B1
(45) Date of Patent: Aug. 3, 2010

(54) SYSTEMS AND METHODS FOR DISTRIBUTING SOFTWARE USING NODES WITHIN A NETWORK GROUP

(75) Inventors: Mark E. Howarth, South Jordan, UT (US); Peter E. Johnson, Lehi, UT (US); Phillip E. Clay, Lindon, UT (US)

(73) Assignee: LANDesk Software Limited, Shannon (IE)

( * ) Notice: Subject to any disclaimer, the term of this patent is extended or adjusted under 35 U.S.C. 154(b) by 1072 days.

(21) Appl. No.: 11/137,312

(22) Filed: May 25, 2005

(51) Int. Cl.
*G06F 9/445* (2006.01)
*G06F 9/44* (2006.01)
*G06F 9/11* (2006.01)
*G06F 15/177* (2006.01)

(52) U.S. Cl. .................. 717/178; 717/173; 709/220; 726/27

(58) Field of Classification Search ......... 717/168–178; 709/201–211, 220–222; 726/27
See application file for complete search history.

(56) References Cited

U.S. PATENT DOCUMENTS

| | | | | |
|---|---|---|---|---|
| 5,008,814 | A * | 4/1991 | Mathur | 717/170 |
| 5,574,860 | A * | 11/1996 | Perlman et al. | 709/220 |
| 5,909,581 | A | 6/1999 | Park | |
| 5,974,250 | A * | 10/1999 | Angelo et al. | 717/171 |
| 6,035,423 | A * | 3/2000 | Hodges et al. | 714/38 |
| 6,047,128 | A | 4/2000 | Zander | |
| 6,226,747 | B1 * | 5/2001 | Larsson et al. | 717/174 |
| 6,493,871 | B1 | 12/2002 | McGuire et al. | |
| 6,651,249 | B2 | 11/2003 | Waldin et al. | |
| 6,915,278 | B1 * | 7/2005 | Ferrante et al. | 705/59 |
| 6,938,075 | B1 * | 8/2005 | Abbott et al. | 717/172 |
| 7,178,144 | B2 * | 2/2007 | Melchione et al. | 717/172 |
| 7,571,227 | B1 * | 8/2009 | Pabla | 709/224 |
| 2002/0049760 | A1 * | 4/2002 | Scott et al. | 707/10 |
| 2004/0019889 | A1 * | 1/2004 | Melchione et al. | 717/177 |
| 2005/0198388 | A1 * | 9/2005 | Teodosiu et al. | 709/245 |
| 2005/0216559 | A1 * | 9/2005 | Manion et al. | 709/205 |
| 2006/0179270 | A1 * | 8/2006 | Archer et al. | 712/11 |

OTHER PUBLICATIONS

Androutsellis-Theotokis et al., "A Survey of Peer-to-Peer Content Distribution Technologies", ACM, Dec. 2004, 37pg.*
Stoica et al., "Chord: A Scalable Peer-to-peer Lookup Service for Internet Applications", ACM, Aug. 2001, 12pg.*

* cited by examiner

*Primary Examiner*—Wei Y Zhen
*Assistant Examiner*—Ryan D Coyer
(74) *Attorney, Agent, or Firm*—Austin Rapp & Hardman

(57) ABSTRACT

A first node within a network group determines whether other nodes within the network group have previously downloaded software from a server. The server is outside the network group. If the software was previously downloaded to a second node within the network group, the software is transferred from the second node to the first node, avoiding the need to download the software directly from the server. If the software was not previously downloaded, a node within the network group is designated to download the software from the server, and then distributes the software to at least one requesting node.

22 Claims, 8 Drawing Sheets

SYSTEMS AND METHODS FOR DISTRIBUTING SOFTWARE USING NODES WITHIN A NETWORK GROUP

TECHNICAL FIELD

The present invention relates generally to computers and computer-related technology. More specifically, the present invention relates to systems and methods for efficiently distributing downloaded software using nodes within a network group.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Historically, software was distributed almost exclusively to consumers through portable media, such as compact disks (CD-ROMs). However, with the increased availability and transmission speeds of the Internet, wide-area networks (WANs) and local area networks, an increasing number of consumers obtain their software and software updates via the Internet, and other networks. Distributing software through the Internet or a network is more convenient to consumers and enables consumers to obtain software more rapidly than through traditional distribution techniques.

Unfortunately, software is becoming more complex and consequently significantly larger, increasing the time and bandwidth needed to download these programs. In addition, more and more software updates are needed to fight the constant barrage of computer viruses and to filter the most recent batch of spam (unsolicited e-mail), further diminishing available bandwidth for other applications. Moreover, the distribution of software through many Internet, or network connections may still be hampered by slow transmission speeds and unreliable connections. Even when the connection speeds are fast over a particular connection, available bandwidth for other important business applications is greatly reduced by computer users downloading the same software to their systems within the same local area network (LAN).

In view of the foregoing, benefits may be realized by improved systems and methods for efficiently and rapidly distributing software to computer users. Some exemplary systems and methods for distributing software are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
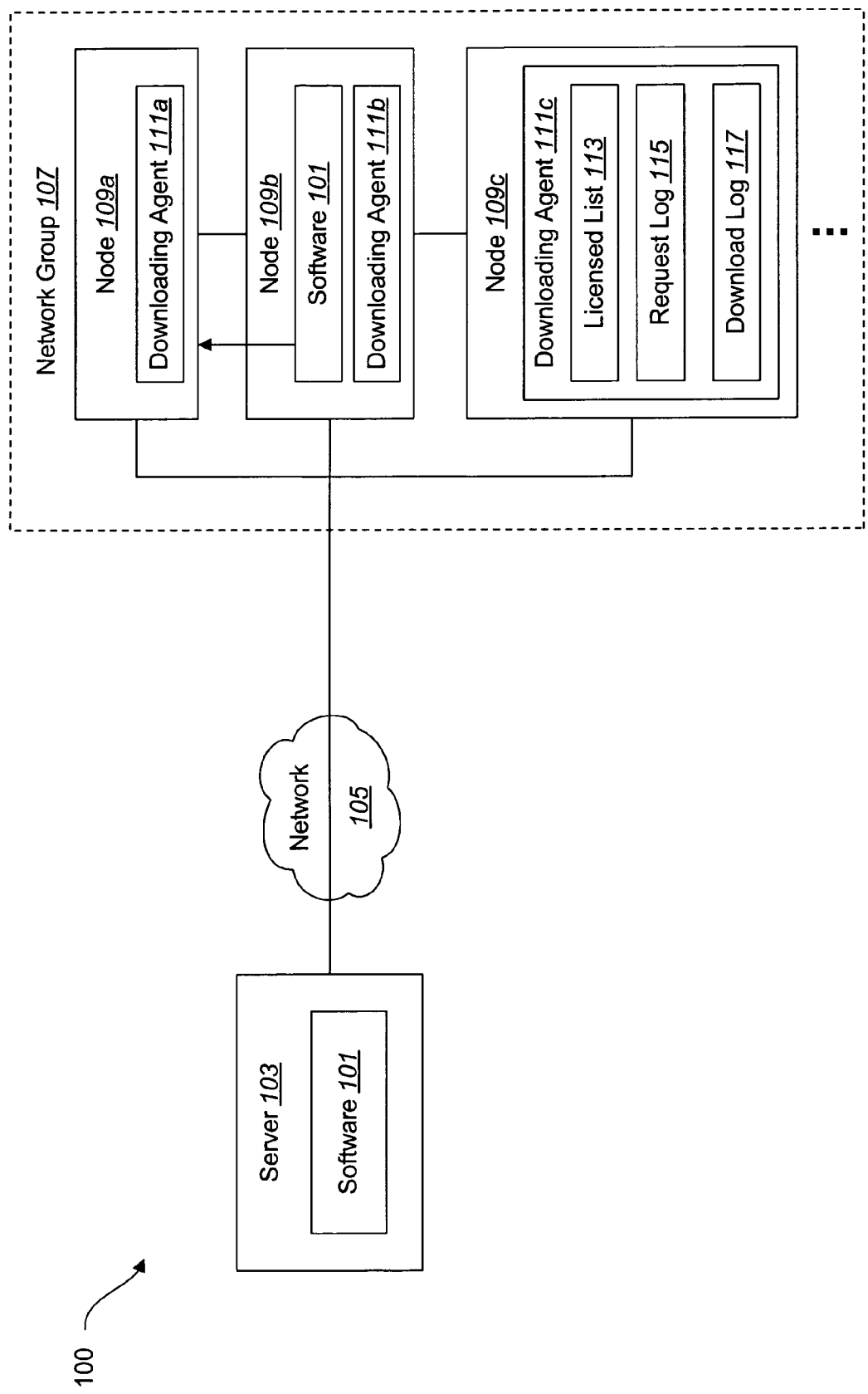
FIG. 1 is a block diagram illustrating one embodiment of a system for efficiently distributing software.

A method of efficiently distributing software to nodes within a network group is disclosed. A first node within a network group determines whether any other node within the network group previously downloaded, or is currently downloading, specified software from a server. The server is outside the network group. If the specified software was previously downloaded from the server to a second node within the network group, the specified software is transferred from the second node to the first node.

If a node that previously downloaded the software cannot be identified, then a node within the network group is designated to download the specified software from the server. The specified software is then downloaded from the server to the designated node. If the designated node is not the first node, the software is transferred from the designated node to the first node.

In one embodiment, it is further determined whether more than the first node within the network group has requested the specified software. If only the first node within the network group has requested the specified software, the specified software is downloaded from the server to the first node. In other embodiments, the software is transferred from the designated node to at least one requesting node besides the first node.

In some embodiments, at least one of the first, second, and designated nodes comprise an end-user node. In one configuration, the network group comprises a local area network. Alternatively, the network group comprises at least one subnet within a larger network. In some embodiments, the specified software comprises one or more updates to an application or an operating system.

Another method of efficiently distributing software to nodes within a network group is also disclosed. A representative node within a network group is designated to download software from a server outside the network group. The software is downloaded from the server to the representative node. It is then determined which nodes within the network group are licensed to run the software. Transfer of the software from the representative node to at least one licensed node within the network group is initiated.

In some embodiments, the representative node is an end-user node. In one embodiment, the specified software comprises one or more updates to an application or an operating system. The network group may be a local area network. In one embodiment, user credentials are passed to the representative node to enable the representative node to establish a connection with other computer systems.

A system that is configured to implement the methods described above is also disclosed. The system includes least two nodes within a network group. The nodes are in electronic communication with each other and in electronic communication with a server. The nodes comprise a computer-readable medium that is part of the nodes or is in electronic communication with the nodes to implement the methods described above. A computer-readable medium, independent of the system described above, comprising executable instructions for implementing the methods described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating an embodiment of a system 100 for efficiently distributing software 101. The system 100 of FIG. 1 includes a server 103, a network 105, and a network group 107. The server 103 and network group 107 are in electronic communication via the network 105. Accordingly, software 101 on the server 103 may be downloaded through the network 105 to connected computer systems 109, or nodes 109, within the network group 107. The software 101 could include, for example, updates to software packages, a complete computer program, data, graphics, or any information that may be transmitted through a computer network 105.

The server 103 is a computer system from which data may be retrieved or downloaded and may be embodied in a wide variety of different configurations. The server 103 is not limited to a computer system using a specific type of hardware or operating system. For example, the server 103 may use Windows® Server 2003 or Windows XP, both from Microsoft Corporation of Redmond, Wash. Alternatively, by way of example, the server 103 could use the Linux open-source operating system.

The network 105 depicted in FIG. 1 may be embodied in a wide variety of configurations and may include a combination of multiple networks. The network 105 may include, for example, a local area network (LAN), storage area networks (SANs), metropolitan area networks (MANs), wide area networks (WANs), and combinations thereof (e.g., the Internet). A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

The network group 107 may also include a network embodied in a wide variety of configurations and protocols, including those enumerated above and, for example, a local area network (LAN), a subnet, or a group of subnets within a larger network. The network group 107 includes two or more nodes 109. The nodes 109 are interconnected and in electronic communication with each other via, for example, a series of routers and/or switches. In one configuration, transmission speeds within the network group 107 exceed transmission speeds within the network 105.

While only three nodes 109 are shown in the network group 107 illustrated in FIG. 1, network groups 107 of different sizes may be used with the systems and methods disclosed herein. For example, a network group 107 may include only two nodes 109 or hundreds of nodes 109.

Certain nodes 109 within the network group 107 may be "group peer" nodes 109 relative to each other. Group peer nodes 109 are on the same hierarchical level within the network group 107. For example, end-user nodes 109 are group peers, while an administrative node 109 and an end-user node 109 are not group peers. An administrative node 109 has administrative rights to manage other nodes 109 within the network group 107. While an end-user node 109 only has rights to administer the node 109 itself, not other nodes 109 within the network group 109. Furthermore, an end-user node 109 may have only limited rights to alter settings on the node 109 itself in accordance with protocols and limitations established by an administrative node 109.

Each node 109 is running a software program shown in FIG. 1 as a "downloading agent" 111. The downloading agent 111 may monitor which software 101 is loaded on a particular node 109. In one embodiment, the downloading agent 111 may also receive input from a computer system of a manufacturer or distributor of the software, or another entity, indicating when software 101 (such as updates) are available. The downloading agent 111 may further receive input from a user of a node 109 indicating that the user would like to download available software 101.

A downloading agent 111 may include various modules, such as a license list 113 indicating which software 101 is licensed for use on the pertinent node 109, a request log 115 indicating which software 101 has been requested by the node 109, and a download log 117 indicating which software 101 has been downloaded to the node 109. These modules may be used in connection with downloading agents 111 in each of the systems, methods, and nodes disclosed herein.

After the downloading agent 111a of the first node 109a determines that software 101 is available for download, it then determines whether any other nodes 109b-c within the network group 107 have previously downloaded or are currently downloading the specified software 101. The downloading agent 111a may do so using a number of different methods. For example, the downloading agent 111a may send a request to the downloading agent 111b-c of the other nodes 109b-c within the network group 107. In response, queried downloading agents 111b-c may send a response to the requesting downloading agent 111a to indicate whether the specified software 101 has previously been downloaded at a pertinent node 109b-c based on, for example, data retrieved from pertinent download logs 117. In one embodiment, the first node 109a may directly query download logs 117 of other nodes 109b-c. Alternatively, the downloading agent 111a may contact another node 109, such as an administrative system within the network group 107 or a computer system of the manufacturer or distributor of the specified software 101, to determine whether the software 101 has previously been downloaded to a node 109b-c within the network group 107. In one embodiment, the downloading agent 111a of the first node 109a searches files on nodes 109b-c within the network group 107 to determine whether the specified software 101, in a compressed or uncompressed format, is on one of the other nodes 109b-c.

In the embodiment illustrated in FIG. 1, the software 101 has previously been downloaded to a second node 109b within the network group 107 from the server 103. As a result, rather than downloading the software 101 directly from the server 103, the specified software 101 is transmitted from the second node 109b to the first node 109a.

This transmission may occur using a number of different techniques. For example, the downloading agent 111a of the first node 109a may transmit a request to the downloading agent 111b of the second node 109b. In response to the request, the transmission of the software 101 from the second node 109b to the first node 109a is initiated by the downloading agent 111 of the second node 109b. In another embodiment, a script locates a pertinent file(s) on the second node 109b and initiates copying of the file(s) from the first node 109a to the second node 109b. In one embodiment, the downloading agent 111b of the second node 109b, transmits a request to the first node 109a to determine if the software 101 has been received at the first node 109a. In response to this request, the first node 109a, when it has received the software 101, transmits the software 101 to the second node 109b. In one embodiment, automated or manual scripts may be used to implement transmission of the software 101 from the first node 109a to the second node 109b.

The disclosed embodiment significantly decreases the burden placed on the network 105. Rather than using the bandwidth of the network 105, the software 101 can quickly be transmitted between nodes 109 within the network group 107, which typically enjoys the high transmission speeds of a LAN. The bandwidth of the network 105 is thus made available for other important tasks. Furthermore, because of the generally higher transmission speeds within the network group 107, transmission is typically accomplished in less time, thus making the resources of nodes 109 within the network group available for other computing tasks at an earlier time.

The disclosed embodiment further diminishes costs where downloads over a network 105 are billed on a per-byte or per-megabyte basis, such as in certain areas in Europe. The specified software 101 only needs to be downloaded across the network 105 once. Thereafter, software is transmitted between nodes 109 within the network group 107, avoiding the additional fees of transmitting the software 101 across the network 105 for each node 109 within the network group 107.

Figure 2:
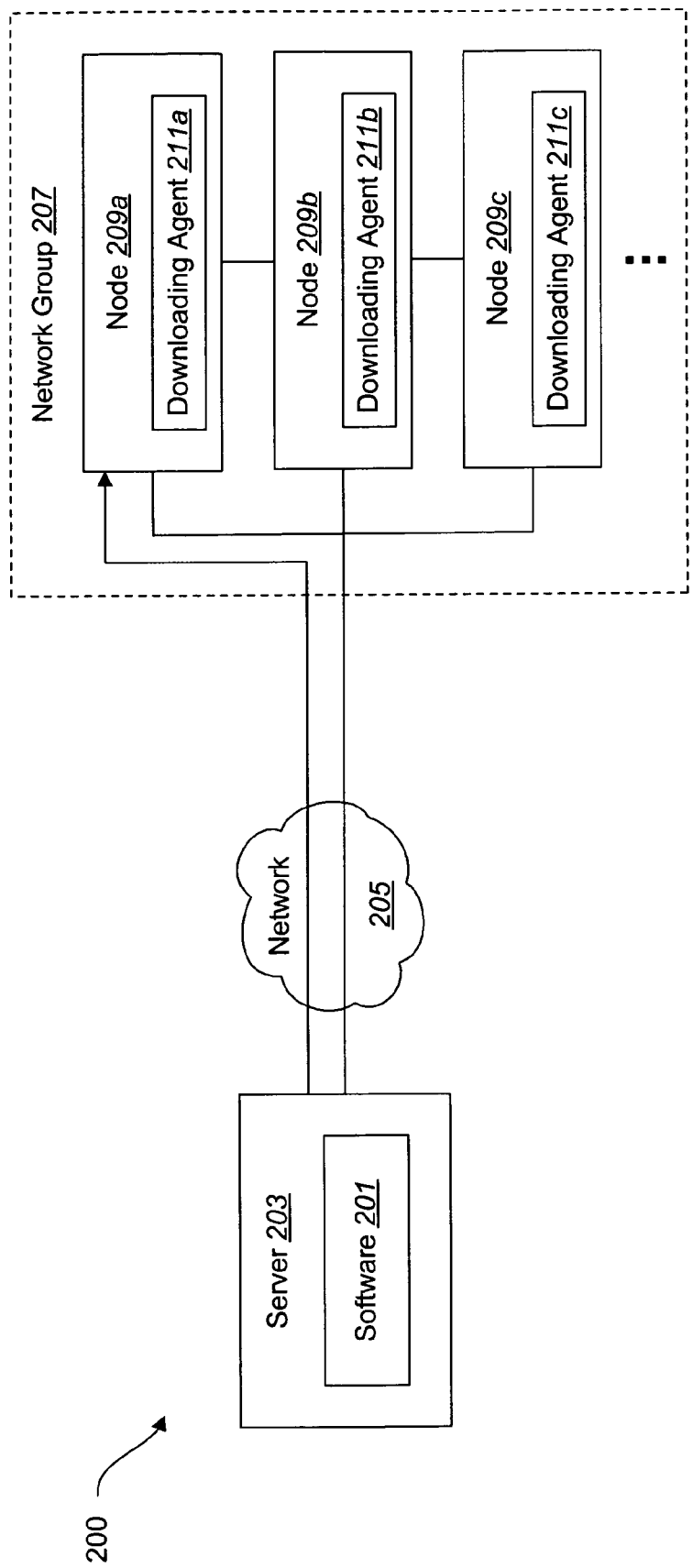
FIG. 2 is a block diagram illustrating another embodiment of a system for distributing software.

FIG. 2 is a block diagram illustrating another embodiment of a system 200 for distributing software 201. As the embodiment disclosed in FIG. 1, a server 203, network 205, and network group 207 in electronic communication are utilized. In the depicted embodiment 200, the software 201 has not yet been downloaded to any node 209 within the network group 207. Furthermore, none of the nodes 209 within the network group 207—besides a first node 209a—have requested the software 201. As a result, the software 201 is downloaded from the server 203 to the first node 209a.

A requesting node 209, in one embodiment, may include a node 209 that has determined that software 201 is available for download and/or is licensed to use the software 201. This determination may be made, for example, based on queries to the server 203 by the downloading agent 211 or input from a user indicating that the software 201 is available for download. In one configuration, for example, the downloading agent 211 may notify a user that software 201 is available for download and prompt the user to indicate whether the software 201 should be downloaded. A request log 115 in the downloading agent 211 of a node 209, in one embodiment, may indicate whether the software 201 has been requested by the node 209.

After the software 201 has been downloaded to the first node 209a, other nodes 209b-c may request the software 201. After determining that the software 201 was previously downloaded to the first node 209a, the software 201 may be transferred from the first node 209a to each requesting node 209 (as illustrated in FIG. 1), avoiding the need to download the software 201 once again from the server 203.

Figure 3:
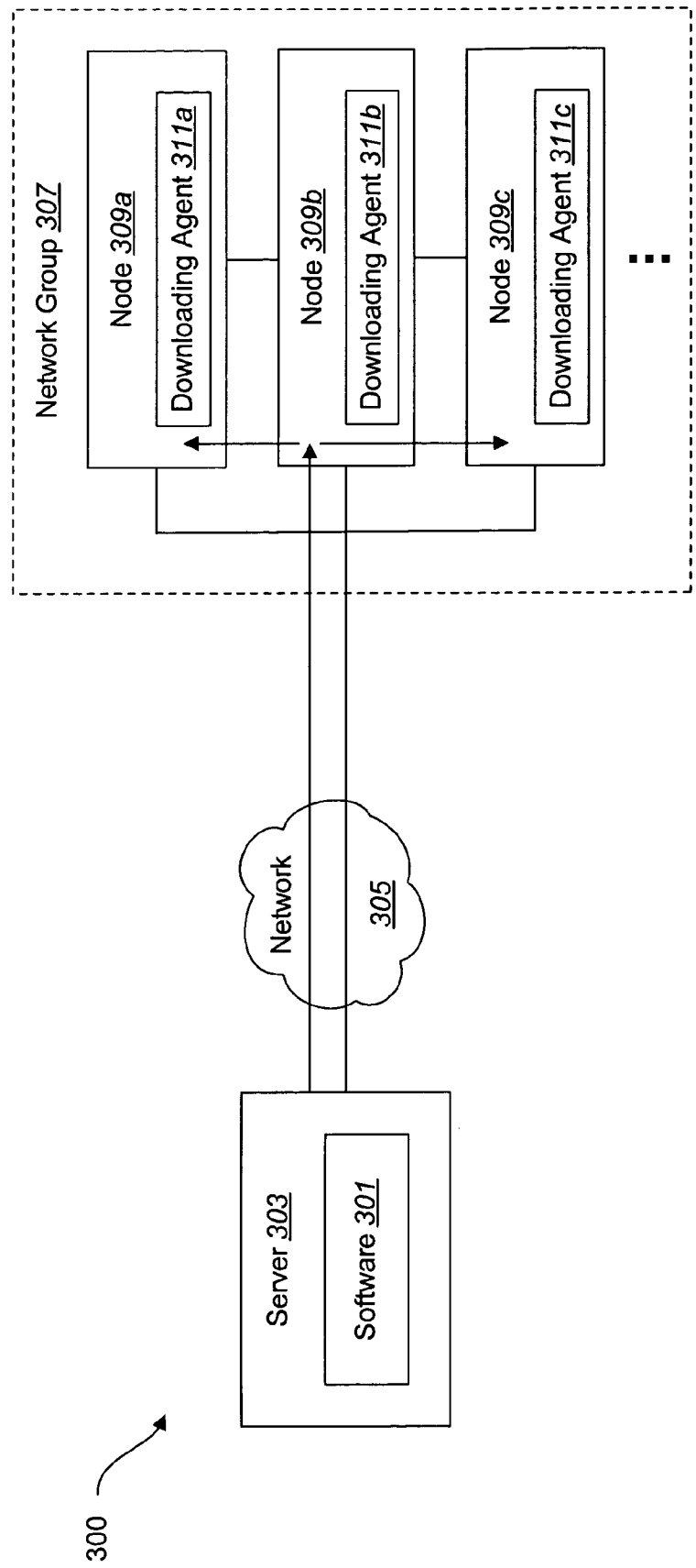
FIG. 3 is a block diagram illustrating yet another embodiment of a system of distributing software.

FIG. 3 is a block diagram illustrating yet another embodiment of a system 300 for distributing software 301. As the embodiment described in FIGS. 1 and 2, the depicted embodiment utilizes a server 303, a network 305, and a network group 307 in electronic communication.

A downloading agent 311 of a first node 309b queries the other nodes 309a, 309c, or a database, to determine whether the software 301 was previously downloaded. In the embodiment described in FIG. 3, no node 309 within the network group 307 has previously downloaded the software 301. Accordingly, being unable to identify a node 309 that previously downloaded the software 301, a node 309b within the network group 307 is designated to download the software 301. In one embodiment, the designated node 309b is selected from a group of requesting nodes 309 within the network group 307. In another embodiment, the designated node 309b is selected from any node 309 within the network group 307. The software 301 is then downloaded to the designated node 309b. Thereafter, the software 301 is transferred to each requesting node 309a, 309c (if any), in the manner shown in FIG. 3.

Figure 4:
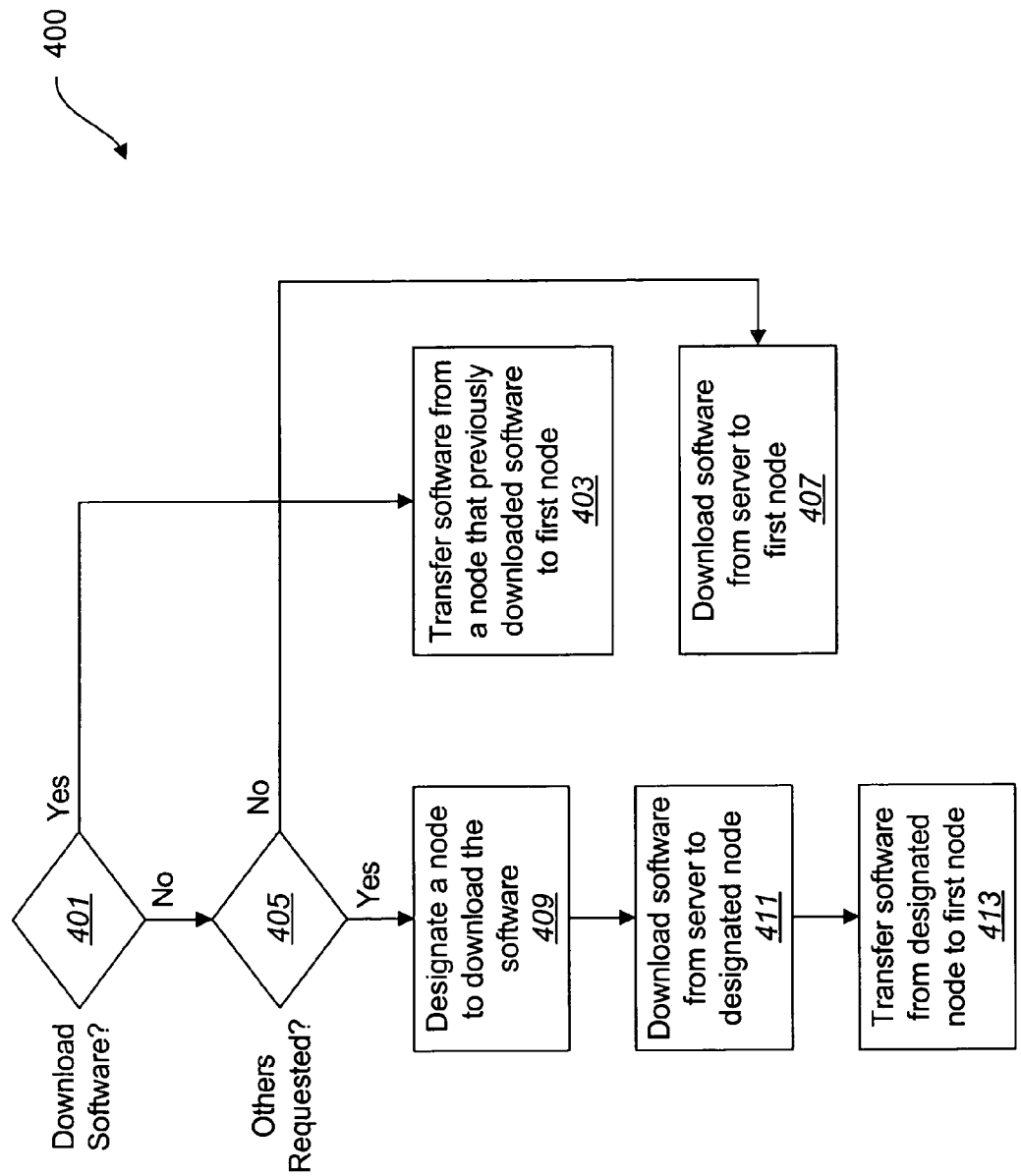
FIG. 4 is a flow diagram illustrating a method of distributing software.

FIG. 4 is a flow diagram illustrating one embodiment of a method 400 for efficiently distributing software. A first node, a requesting node, within a network group 107 determines 401 whether any other node within the network group previously downloaded specified software from a server 103 outside the network group 107 based on, for example, data obtained from a download log 117. If the specified software was previously downloaded from a server to a second node within the network group, the specified software is transferred 403 from the second node to the first node (as shown in FIG. 1).

In one embodiment, the first node determines 405 whether more than one node—besides the first node—within the network group has requested the specified software. Such a determination may be made, for example, by querying request logs 115 of nodes 109 within the network group 107. If the first node is the only requesting node and the software was not previously downloaded to another node, the software is downloaded 407 from the server to the first node (as shown in FIG. 2).

If a node that previously downloaded the software cannot be identified and other nodes have requested the software, then the following three steps are performed (as shown in FIG. 3).

First, a node within the network group is designated 409 to download the specified software from the server. Various techniques may be used to determine which node will be designated. For example, in one embodiment, if the network group is a Transmission Control Protocol/Internet Protocol (TCP/IP) network, the node within the network group having the lowest or highest Internet protocol (IP) address may be designated. Alternatively, as another example, the first requesting node 109 may be designated to download the software or the node 109 with the most available computing resources will be selected.

Second, the specified software is downloaded 411 from the server to the designated node. Various transfer protocols may be used to download the file.

Third, if the designated node is not the first node, the software is transmitted 413 from the designated node to the first node. If multiple nodes within a network group have requested the software, the software is also transferred, or may be later transferred, to at least one requesting node.

The first, second, and designated nodes may be end-user or administrative nodes within the network group. In one embodiment, the first, second, and designated nodes are end-user nodes. Furthermore, the first, second, and designated nodes may be group peers within the network group.

Figure 5:
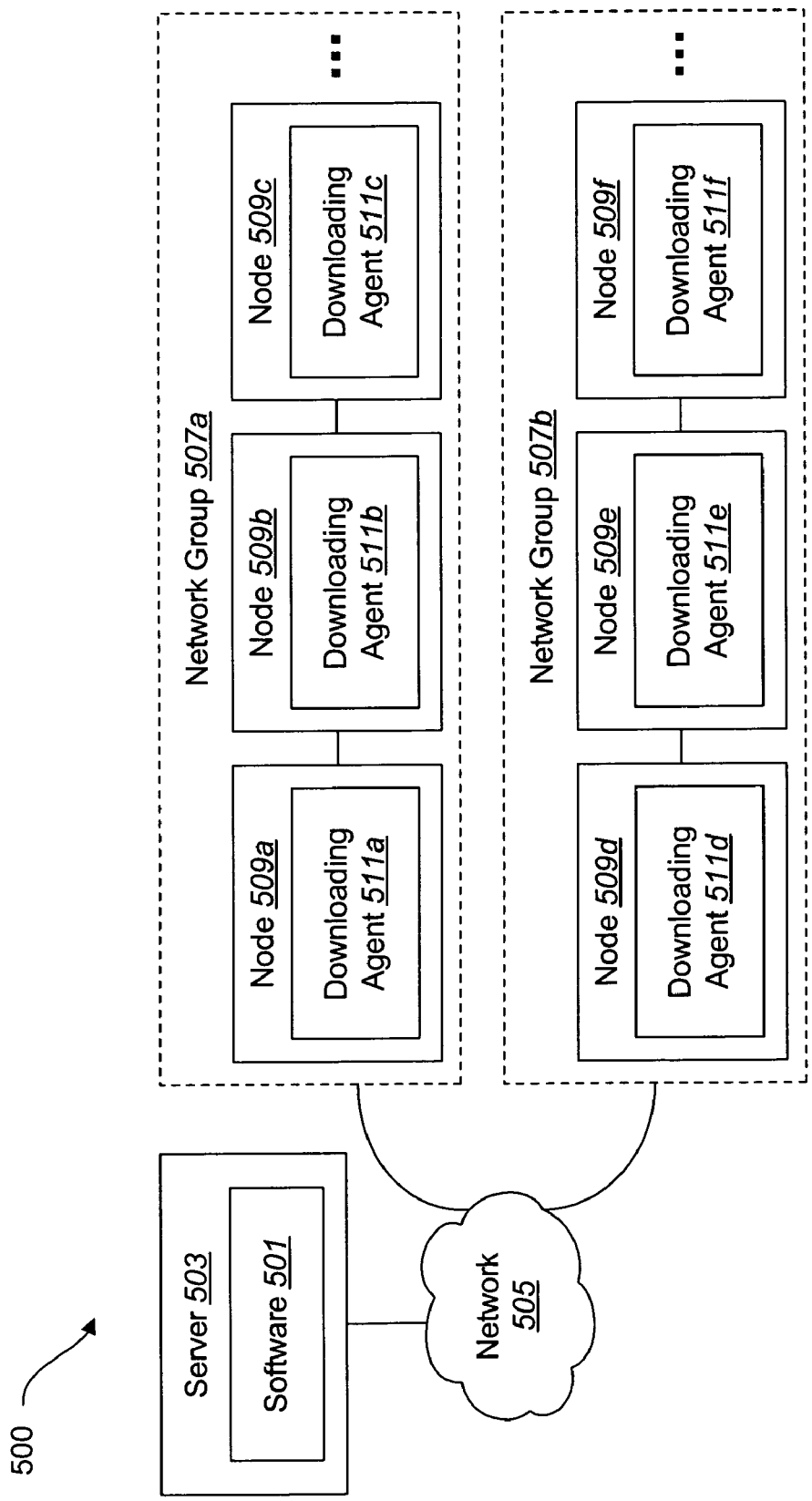
FIG. 5 is a block diagram illustrating another system of distributing software.

FIG. 5 is a block diagram illustrating another system 500 for software 501 distribution. The embodiment shown in FIG. 5 includes a server 503, a network 505, and one or more network groups 507. Each network group 507 includes two or more nodes 509. The nodes 509 are in electronic communication with each other, for example, through a switch or a router. In the embodiment of FIG. 5, one of the nodes 509 within each network group 507 is designated as a representative node 509*a*, 509*d* before any of the nodes 509 have requested the software. Designation of a representative node 509*a*, 509*d* may occur, for example, when the network group 507 is established or when the downloading agents 511 are installed on to nodes 509 within the computer network 507. Each representative node 509*a*, 509*d* is in electronic communication with the server 503 through the network 505.

At least two nodes 509 within the network group 507 are running a downloading agent 511. The downloading agents 511 may contain information modules, such as a license list, a download log, or a request log.

The downloading agent 511*a*, 511*d* of the representative node 509*a*, 509*d* is configured to determine when software 501 is available for download from the server 503, either based on data gathered by the downloading agent 511*a*, 511*d* or input provided to the agent 511*a*, 511*d* by a user. When the downloading agent 511*a*, 511*d* of the representative node 509*a*, 509*d* determines that software 501 is available for download from the server 503, the downloading agent 511*a*, 511*d* initiates a downloading process.

When the software 501 has been downloaded, or prior thereto, the representative node 509*a*, 509*d* identifies each node 509 within the network group 507 and then determines which nodes 509 are licensed to use the software 501, for example, by querying a license list 113 within a downloading agent 511. The software 501 may be then transferred to each licensed and/or requesting node 509 within the network group 507.

Figure 6:
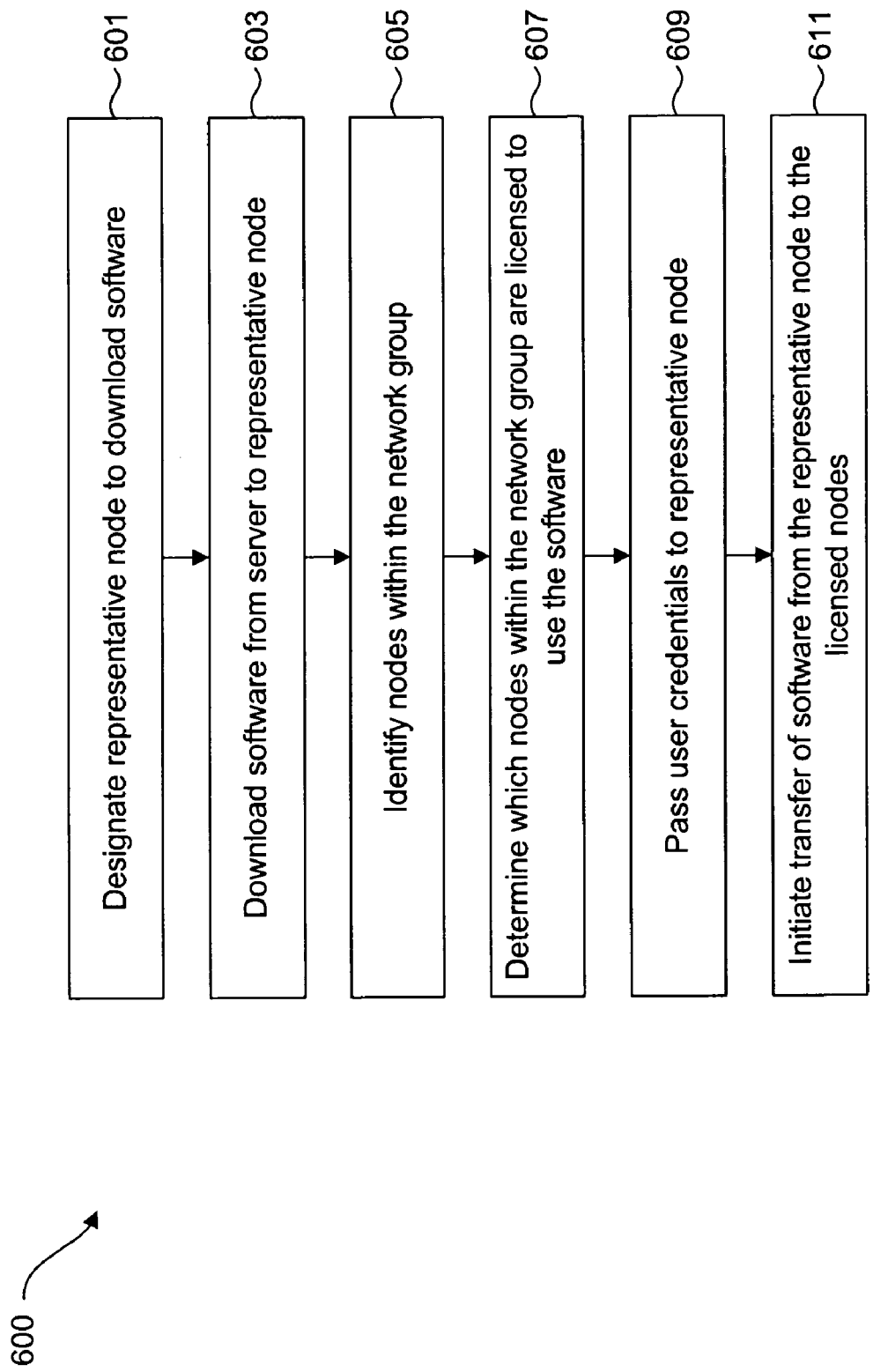
FIG. 6 is a flow diagram illustrating an embodiment of a method for distributing software.

FIG. 6 is a flow diagram illustrating one embodiment of a method 600 for software distribution. In the embodiment of FIG. 6, a representative node within a network group 507 is designated 601. Again, the network group may be embodied as, for example, a local area network, a subnet or a group of subnets within a network.

Following designation of a representative node, specified software 501 is downloaded 603 from a server 503 outside the network group 507. The designated node identifies 605 each node within the network group. This may be achieved in a number of different ways. For example, the designated node may obtain the information from a database or by querying nodes of the network group directly, or by querying the server 503 about each node in the network group, or from querying cached files or a cached list.

The designation of a representative node may be made using various techniques or methods. By way of example only, designation may be made using an automated algorithm (such as selecting the node with the highest IP address). Alternatively, the designation may be made in response to user input selecting the designated node (such as the input of an administrator of the network group). The representative node may be an end-user or an administrative node.

Thereafter, the designated node determines 607 which nodes within the network group are licensed to operate the software. In one embodiment, a downloading agent contains data indicating which software products are licensed for use on the pertinent node. This data, upon request from the designated node, is transmitted to the designated node. Alternatively, for example, the license information may be obtained from an administrative database, a third party, or manufacturers or distributors of the software.

In one embodiment, user credentials are passed 609 to the representative node. The user credentials enabled the representative node to establish network connections with other nodes within the network group that did not previously allow the representative node to connect to, such as nodes that have not previously downloaded the software. Newly established network connections, through use of the credentials, enable the representative node to more widely distribute the software.

Based on this determination, the designated node initiates 611 transfer of the specified software to licensed nodes and/or requesting nodes within the network group. Again, various techniques may be used to transfer the software to each node.

Figure 7:
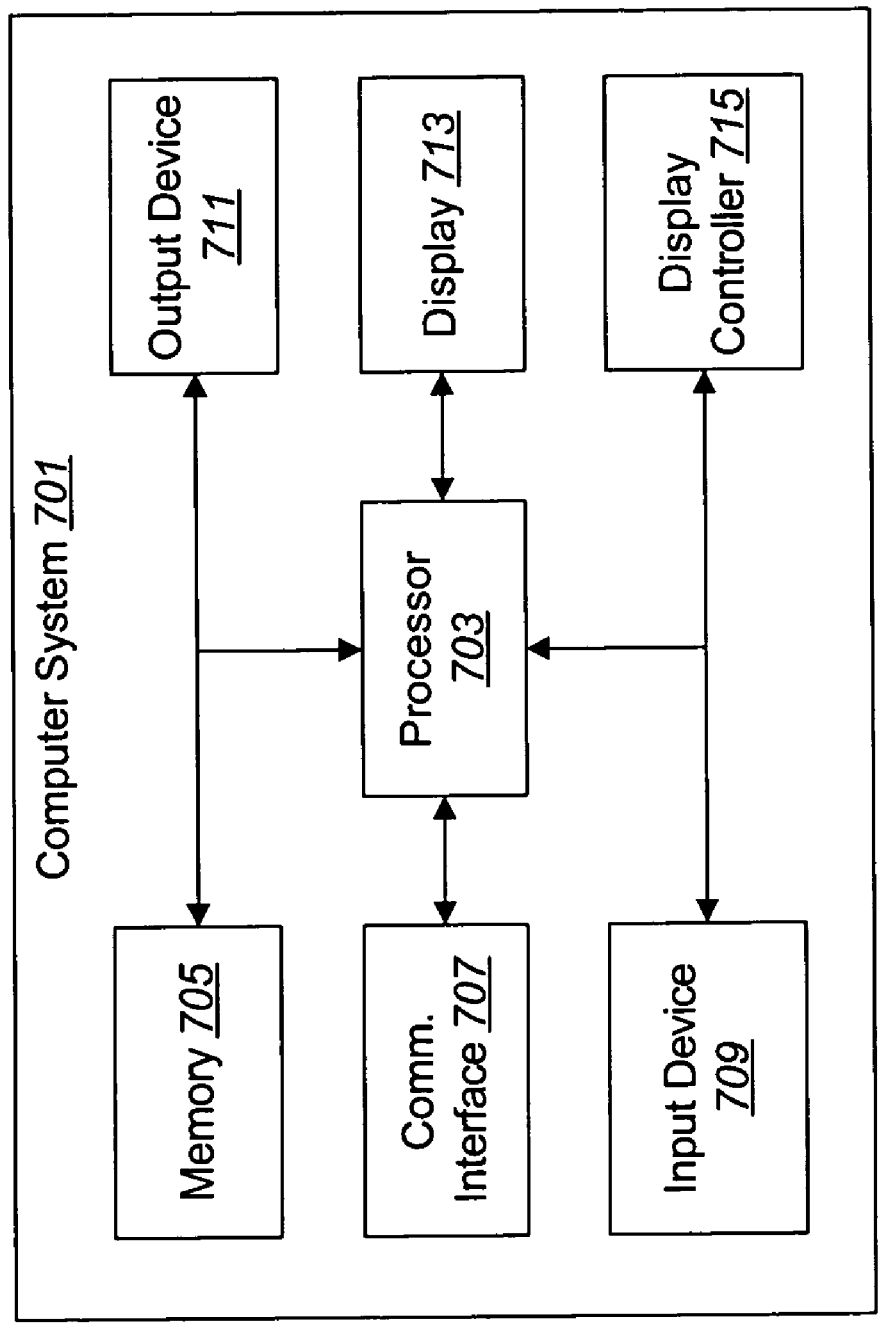
FIG. 7 is a block diagram illustrating major hardware components typically utilized in a computer or computing device.

FIG. 7 is a block diagram illustrating the major hardware components typically utilized in a computer system 701. The illustrated components may be located within the same physical structure or in separate housings or structures.

The computer system 701 includes a processor 703 and memory 705. The processor 703 controls the operation of the computer system 701 and may be embodied as a microprocessor, a microcontroller, a digital signal processor (DSP) or other device known in the art. The processor 703 typically performs logical and arithmetic operations based on program instructions stored within the memory 705.

As used herein, the term memory 705 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 705 typically stores program instructions and other types of data. The program instructions may be executed by the processor 703 to implement some or all of the methods disclosed herein.

The computer system 701 typically also includes one or more communication interfaces 707 for communicating with other electronic devices. The communication interfaces 707 may be based on wired communication technology, wireless communication technology, or both. Examples of different types of communication interfaces 707 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 701 typically also includes one or more input devices 709 and one or more output devices 711. Examples of different kinds of input devices 709 include a keyboard, mouse, microphone, remote control device, button, joystick, trackball, touchpad, lightpen, etc. Examples of different kinds of output devices 711 include a speaker, printer, etc. One specific type of output device which is typically included in a computer system is a display device 713. Display devices 713 used with embodiments disclosed herein may utilize any suitable image projection technology, such as a cathode ray tube (CRT), liquid crystal display (LCD), light-emitting diode (LED), gas plasma, electroluminescence, or the like. A display controller 715 may also be provided, for converting data stored in the memory 705 into text, graphics, and/or moving images (as appropriate) shown on the display device 713.

Of course, FIG. 7 illustrates only one possible configuration of a computer system 701. Various other architectures and components may be utilized.

Figure 8:
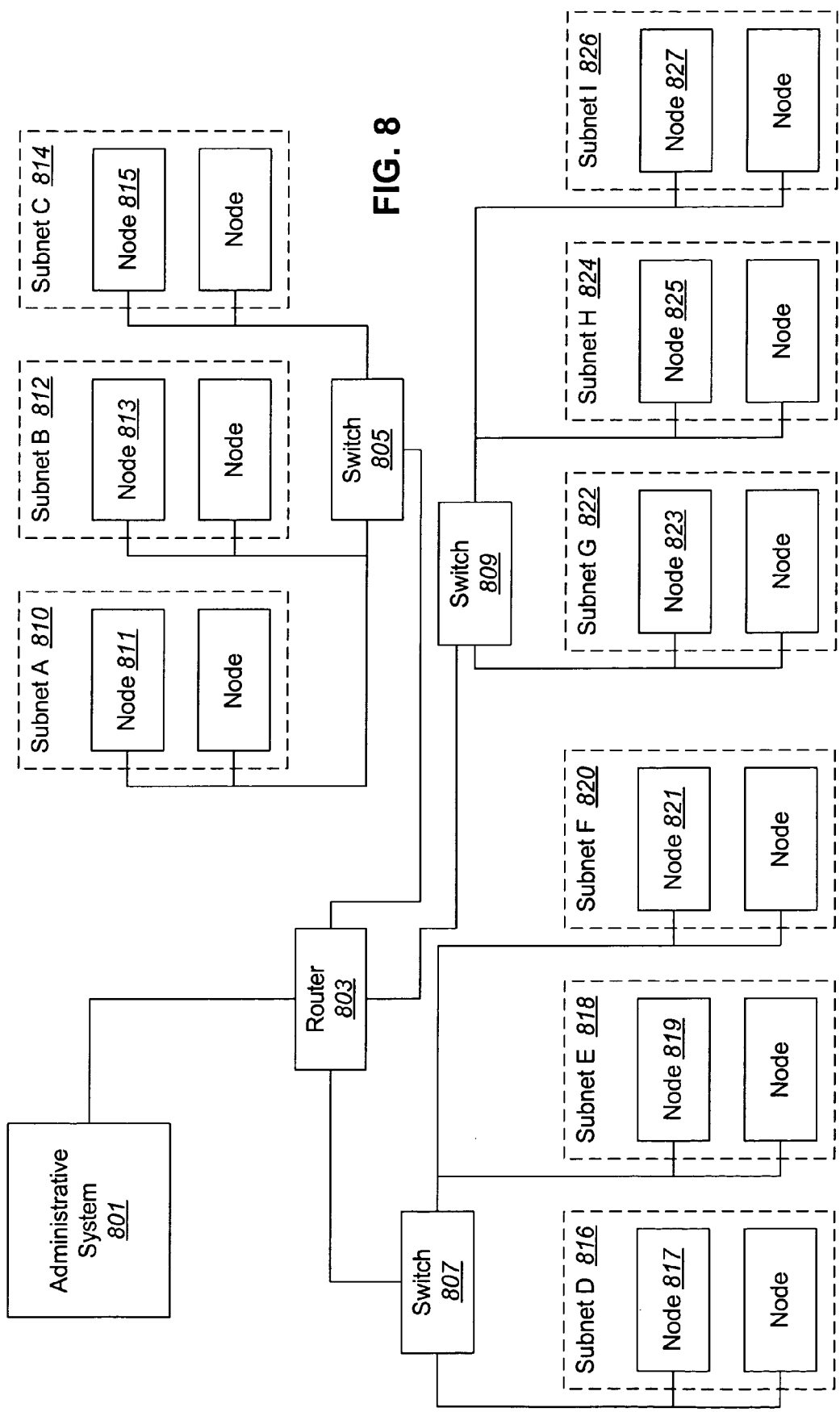
FIG. 8 is an exemplary block diagram illustrating a computer network on which the present systems and methods may be implemented.

FIG. 8 is an exemplary block diagram illustrating a computer network on which the present systems and methods may be implemented. In FIG. 8, an administrative system 801 connects to a router 803. The administrative system 801, or administrative node 801, may be any computer or computing device that has been configured to, or is being used for, receiving notifications from one or more monitors.

The router 803 may be connected to three switches: a first switch 805, a second switch 807 and a third switch 809. Each switch 805, 807, 809 connects to three subnets. The first switch 805 connects to three subnets 810, 812, and 814. The second switch 807 connects to three subnets 816, 818, and 820. The third switch 809 connects to three subnets 822, 824, and 826. The network groups 107, 207, 307, 507 described above may be embodied in a wide variety of configurations and may include a local area network, a subnet 810, 812, and 814, or a group of subnets 810, 812, and 814. The network nodes or elements 811, 813, 815, 817, 819, 821, 823, 825 and 827 represent computer systems or devices on the computer network. One or more of the nodes may use embodiments of the systems and methods described herein. The network may include both wired and wireless connections to nodes or elements 811, 813, 815, 817, 819, 821, 823, 825 and 827 within the network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method of efficiently distributing software to nodes within a network group, comprising:

determining from a first node within a network group
        whether any other node within the network group previously downloaded, or is currently downloading, specified software from a server, the server being outside the network group, wherein a download log is maintained for each node within the network group, and wherein determining whether a particular node previously downloaded, or is currently downloading, the specified software comprises querying the download log for that node;

if the specified software was previously downloaded from the server to a second node within the network group, transferring the specified software from the second node to the first node;

if a node that previously downloaded the software cannot be identified, then:

determining whether any other node within the network group has requested the specified software, wherein a request log is maintained for each node within the network group, and wherein determining whether a particular node has requested the specified software comprises querying the request log for that node;

designating a node within the network group to download the specified software from the server, wherein any of the nodes within the network group may be selected as the designated node;

downloading the specified software from the server to the designated node; and transferring the specified software from the designated node to the first node if the designated node is not the first node.

2. The method of claim 1, wherein at least one of the first, second, and designated nodes comprise an end-user node.

3. The method of claim 1, wherein the network group comprises a local area network.

4. The method of claim 1, wherein the network group comprises at least one subnet within a larger network.

5. The method of claim 1, wherein the specified software comprises one or more updates to an application or an operating system.

6. The method of claim 1, further comprising:
transmitting the software from the designated node to at least one requesting node besides the first node.

7. The method of claim 1, further comprising:
if only the first node within the network group has requested the specified software, downloading the specified software from the server to the first node.

8. A system of efficiently distributing software to nodes within a network group, comprising:
a processor;
memory in electronic communication with the processor;
instructions stored in the memory, the instructions being executable to:
determine from a first node within the network group whether any other node within the network group previously downloaded, or is currently downloading, specified software from a server, the server being outside the network group, wherein a download log is maintained for each node within the network group, and wherein determining whether a particular node previously downloaded, or is currently downloading, the specified software comprises querying the download log for that node;

if the specified software was previously downloaded from the server to a second node within the network group, transfer the specified software from the second node to the first node;

if a node that previously downloaded the software cannot be identified, then:

determine whether any other node within the network group has requested the specified software, wherein a request log is maintained for each node within the network group, and wherein determining whether a particular node has requested the specified software comprises querying the request log for that node;

designate a node within the network group to download the specified software from the server, wherein any of the nodes within the network group may be selected as the designated node;

download the specified software from the server to the designated node; and transfer the specified software from the designated node to the first node if the designated node is not the first node.

9. The system of claim 8, wherein at least one of the first, second, and designated nodes comprise an end-user node.

10. The system of claim 8, wherein the network group comprises at least one subnet within a larger network.

11. The system of claim 8, wherein the specified software comprises one or more updates to an application or an operating system.

12. The system of claim 8, wherein the instructions are further executable to:
transmit the software from the designated node to at least one requesting node besides the first node.

13. The system of claim 8, wherein the instructions are further executable to:
if only the first node within the network group has requested the specified software, download the specified software from the server to the first node.

14. A non-transitory computer-readable medium comprising executable instructions for efficiently distributing software to nodes within a network group, the instructions being executable to:
determine from a first node within a network group whether any other node within the network group previously downloaded, or is currently downloading, specified software from a server, the server being outside the network group, wherein a download log is maintained for each node within the network group, and wherein determining whether a particular node previously downloaded, or is currently downloading, the specified software comprises querying the download log for that node;

if the specified software was previously downloaded from the server to a second node within the network group, transfer the specified software from the second node to the first node;

if a node that previously downloaded the software cannot be identified, then:

determine whether any other node within the network group has requested the specified software, wherein a request log is maintained for each node within the network group, and wherein determining whether a particular node has requested the specified software comprises querying the request log for that node;

designate a node within the network group to download the specified software from the server, wherein any of the nodes within the network group may be selected as the designated node;

download the specified software from the server to the designated node; and transfer the specified software from the designated node to the first node if the designated node is not the first node.

15. The computer-readable medium of claim 14, wherein at least one of the first, second, and designated nodes comprise an end-user node.

16. The computer-readable medium of claim 14, wherein the instructions are further executable to:
- transmit the software from the designated node to at least one requesting node besides the first node.

17. The computer readable medium of claim 14, wherein the instructions are further executable to:
- if only the first node within the network group has requested the specified software, download the specified software from the server to the first node.

18. A method of efficiently distributing software to nodes within a network group, comprising:
- determining whether any other node within the network group previously downloaded, or is currently downloading, software from a server, the server being outside the network group, wherein a download log is maintained for each node within the network group, and wherein determining whether a particular node previously downloaded, or is currently downloading, the specified software comprises querying the download log for that node; and
- if a node that previously downloaded the software cannot be identified, then:
  - determining whether any other node within the network group has requested the specified software, wherein a request log is maintained for each node within the network group, and wherein determining whether a particular node has requested the specified software comprises querying the request log for that node;
  - designating a representative node within the network group to download the software from the server outside the network group, wherein any of the nodes within the network group may be selected as the representative node;
  - downloading the software from the server to the representative node;
  - determining which nodes within the network group are licensed to run the software; and
  - initiating transfer of the software from the representative node to at least one licensed node within the network group.

19. The method of claim 18, wherein the representative node is an end-user node.

20. The method of claim 18, wherein the specified software comprises one or more updates to an application or an operating system.

21. The method of claim 18, wherein the network group is a local area network.

22. The method of claim 18, further comprising:
- passing user credentials to the representative node to enable the representative node to establish a connection with other computer systems.

* * * * *